United States Patent [19]

Oshita et al.

[11] Patent Number: 4,875,541
[45] Date of Patent: Oct. 24, 1989

[54] ELECTRIC POWER STEERING SYSTEM

[75] Inventors: Saiichiro Oshita; Toyohiko Mouri; Tsutomu Takahashi, all of Ohta; Shinji Itou, Oomama, all of Japan

[73] Assignee: Fuji Jukogyo Kabushiki Kaisha, Tokyo, Japan

[21] Appl. No.: 203,286

[22] Filed: Jun. 6, 1988

[30] Foreign Application Priority Data

Jun. 8, 1987 [JP] Japan .................................. 62-143865

[51] Int. Cl.4 .......................... B62D 5/04; B62D 6/02
[52] U.S. Cl. ..................................... 180/79.1; 180/140
[58] Field of Search ....................... 180/79.1, 142, 141; 74/388 PS

[56] References Cited

U.S. PATENT DOCUMENTS 4,629,952 12/1986 Shimizu .............................. 180/79.1
4,664,211 5/1987 Oshita et al. ....................... 180/79.1

FOREIGN PATENT DOCUMENTS 61-98675 5/1986 Japan .

Primary Examiner—John A. Pekar
Attorney, Agent, or Firm—Martin A. Farber

[57] ABSTRACT

A system having a motor operatively connected to a steering system for reducing the steering effort. The system is provided with a torsion torque sensor provided for detecting torsion torque generating in the steering system in steering operation. In response to the output signal of the torsion torque sensor, an assist signal is produced. The system has a dead zone for the output signal of the torsion torque sensor. Only when the output signal exceeds the dead zone, the assist signal is produced to operate the motor.

2 Claims, 7 Drawing Sheets

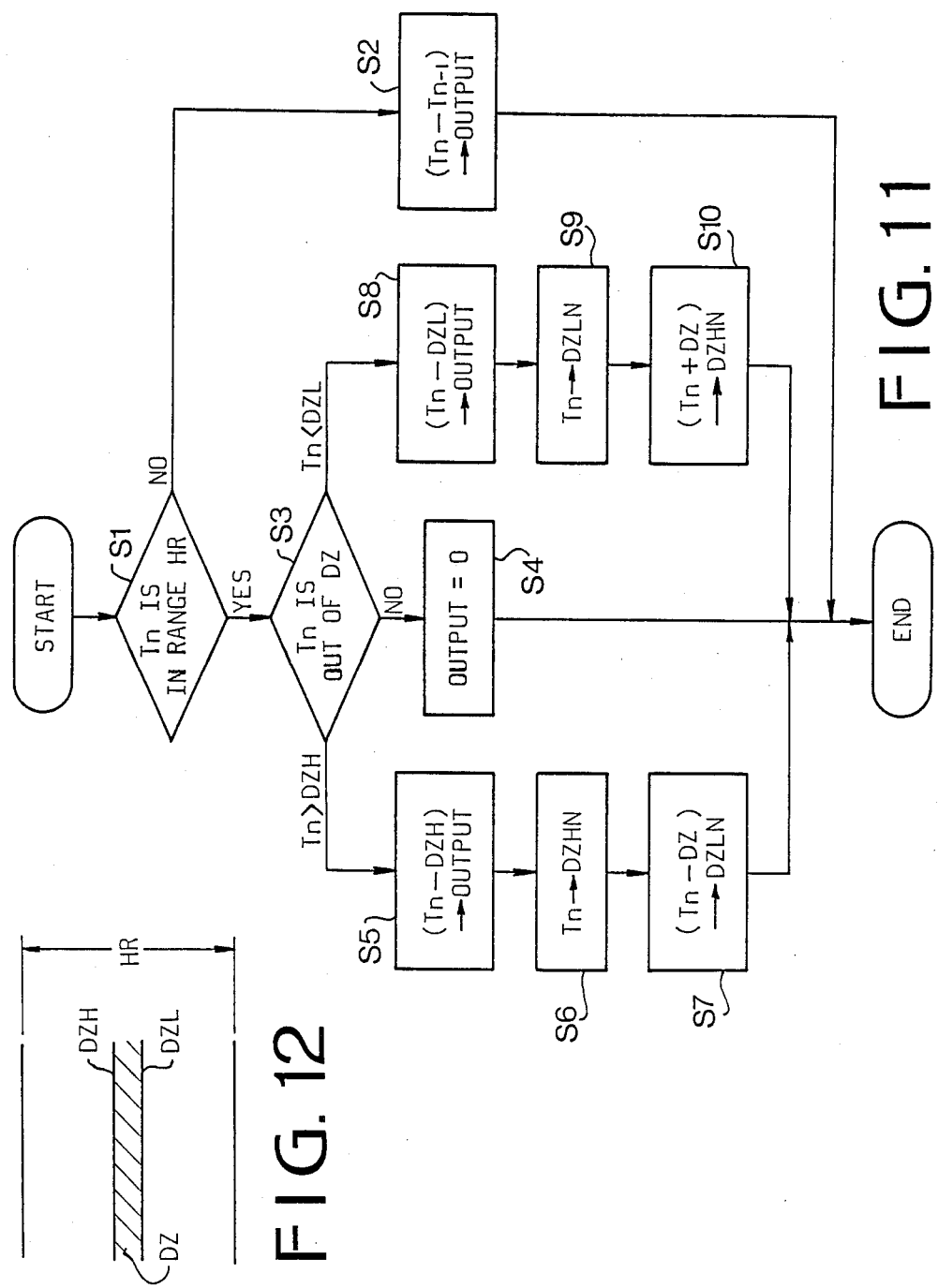

ELECTRIC POWER STEERING SYSTEM

BACKGROUND OF THE INVENTION

The present invention relates to an electric power steering system for a motor vehicle, and more particularly to a system for controlling an electric motor in accordance with the turning of a steering wheel.

U.S. Pat. No. 4,664,211 discloses an electric power steering system. The system is provided for producing an assist signal dependent on the torsion torque signal from a torsion torque sensor and on the vehicle speed, an auxiliary assist signal dependent on the differentiation of the torsion torque signal, a return torque signal depending on an output signal of a steering angle sensor, for returning the steering wheel to a neutral position, and a damping signal depending on the differentiation of the steering angle signal. These signals are added for controlling the motor.

The auxiliary assist signal and the damping signal are provided for compensating the inertia of the motor. However, since each signal is dependent on the differentiation of the output of the sensor, the system produces the signal in response also to a small output of the sensor which is caused by noises during driving. Such a signal is generated even if the vehicle travels straight, so that vain current flows in the system, consisting electric power.

SUMMARY OF THE INVENTION

The object of the present invention is to provide a system which does not respond to a small output of a sensor, thereby preventing the consumption of electric power.

According to the present invention, there is provided an electric power steering system having a motor operatively connected to a steering system for reducing steering effort, a torsion torque sensor provided for detecting torsion torque generating in the steering system in steering operation, assist means responsive to the output signal of the torsion torque sensor for producing an assist signal, driving means responsive to the assist signal for producing a signal for driving the motor to turn a steering wheel, a steering angle sensor provided for detecting steering angle of the steering wheel and for producing a steering angle signal, return means responsive to the steering angle signal for operating the motor to return the steering wheel.

The system comprises the assist means including first hysteresis providing means having a first dead zone and for producing the assist signal when the output signal of the torsion torque sensor exceeds the range of the first dead zone.

In an aspect of the invention, hysteresis providing means has a hysteresis providing range and the dead zone is moved within the range when the output signal exceeds the range of the dead zone.

In another aspect of the invention, damping signal means is provided to respond to differentiation of the steering angle signal for producing a damping signal, the damping signal means including second hysteresis providing means having a second dead zone and for producing the damping signal when the steering angle signal exceeds the range of the second dead zone.

The other objects and features of this invention will become understood from the following description with reference to the accompanying drawings.

BRIEF DESCRIPTION OF DRAWINGS

FIG. 11 is a flow chart showing an operation of the system; and

FIG. 12 shows a dead zone.

DETAILED DESCRIPTION OF THE PREFERRED EMBODIMENT

Figure 1:
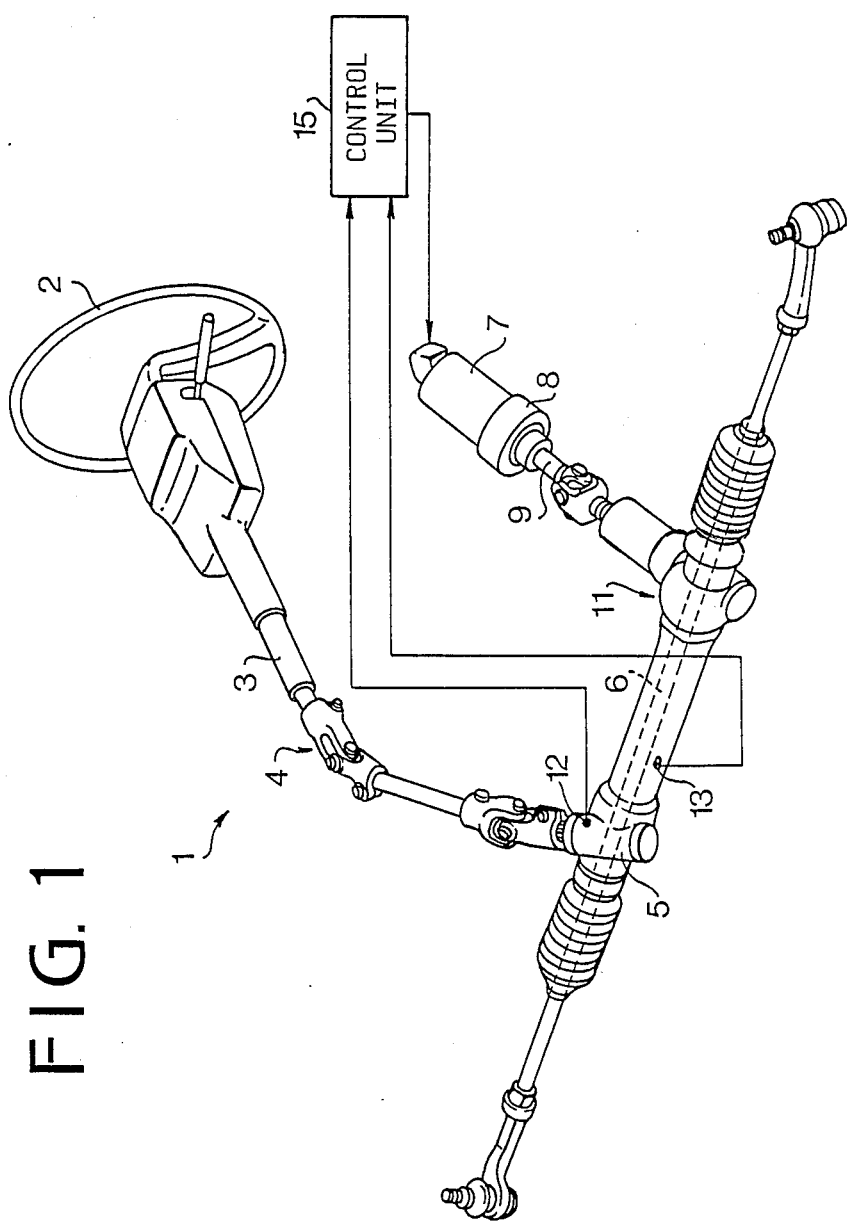
FIG. 1 is a perspective view showing a power steering system to which the present invention is applied.

Referring to FIG. 1, a steering system 1 is a rack-and-pinion type and comprises a steering wheel 2, steering shaft 3, joint 4, gear box 5, and rack 6. Another rack-and-pinion device 11 is provided for an electric power steering. A pinion of the device 11 is engaged with the rack 6. The pinion is operatively connected with an output shaft 9 of a reduction gear device 8 attached to a motor 7. A torsion torque sensor 12 is provided on gear box 5 for measuring the torsion torque of the steering shaft, and a steering angle sensor 13 is provided adjacent to the rack 6 so as to measure the axial movement of the rack 6 corresponding to the steering angle. Outputs of the sensors 12 and 13 are applied to a control unit 15 of the present invention.

Figure 2A:
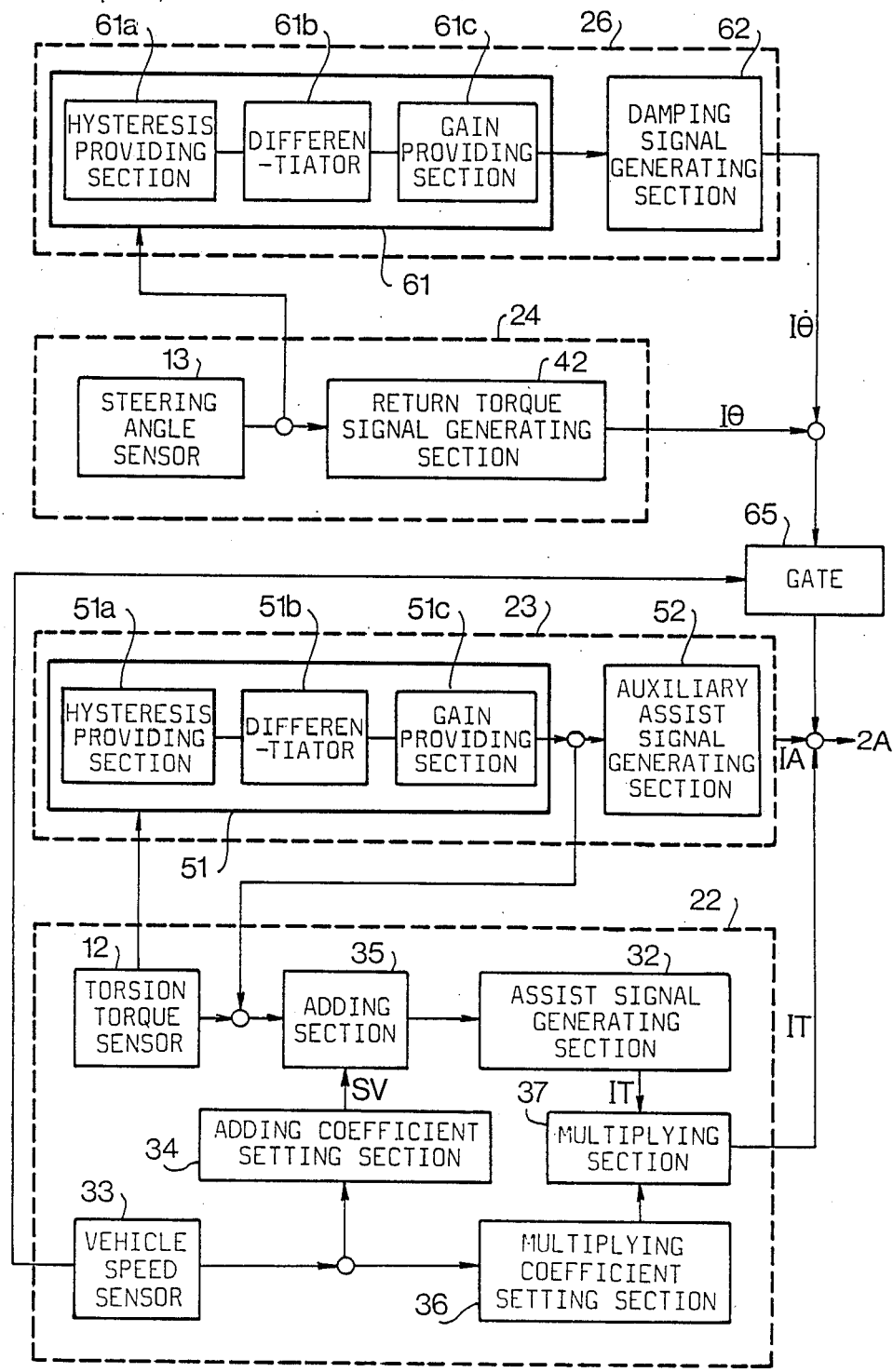
FIG. 2a and 2b are a block diagram of a system according to the present invention.
Figure 2B:
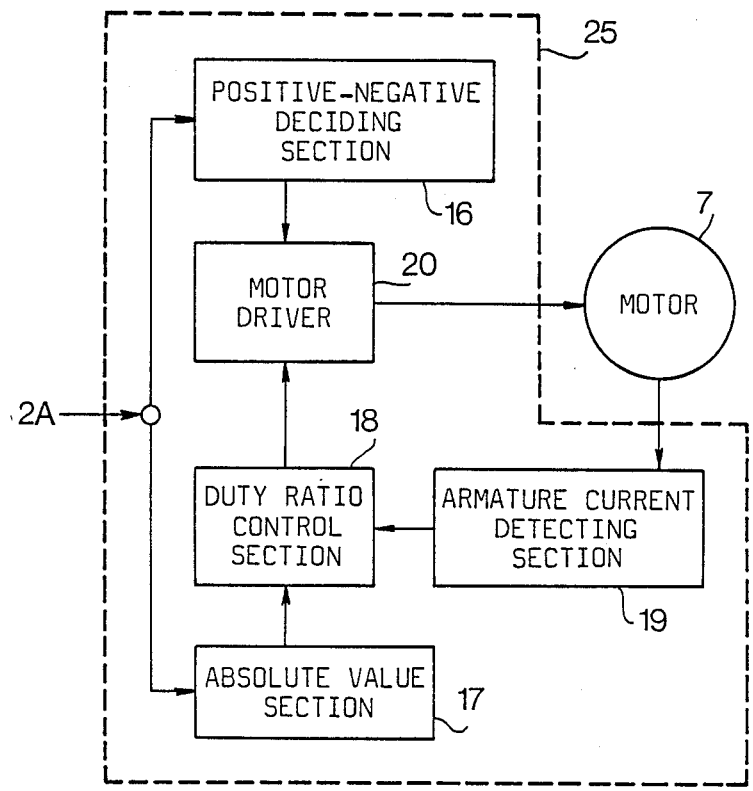

FIGS. 2a and 2b show the control unit 15 which comprises an assist command section 22, auxiliary assist command section 23, return command section 24, damping command section 26, and drive control section 25.

Figure 3:
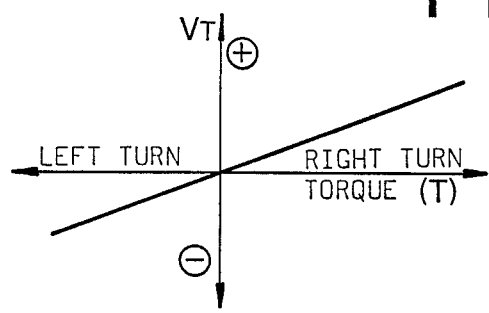
FIG. 3 is a graph showing an output characteristic of a torsion torque sensor.
Figure 4:
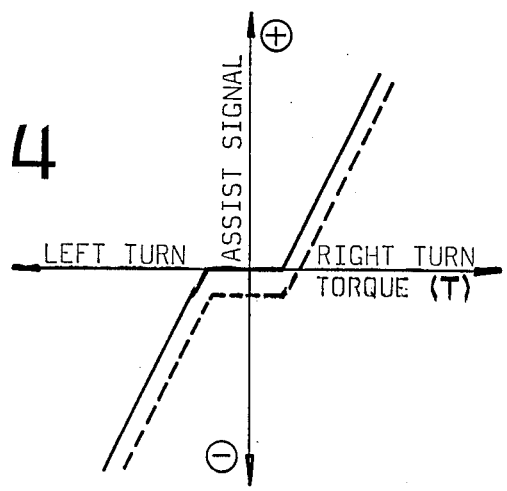
FIG. 4 is a graph showing a characteristic of assist signals.
Figure 5:
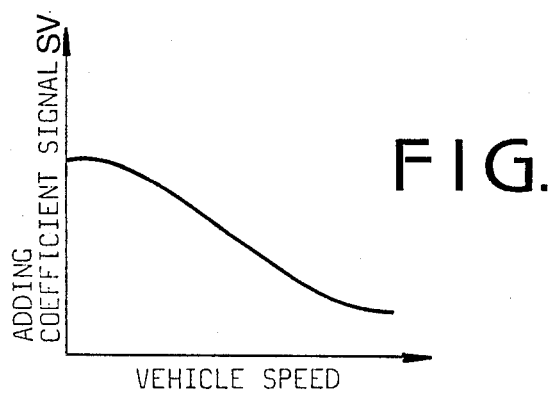
FIG. 5 is a graph showing a characteristic of an adding coefficient signal.

The assist command section 22 comprises the torsion torque sensor 12 and a vehicle speed sensor 33. The torsion torque sensor 12 produces an output signal representing the torsion torque and the direction of the torsion at the steering shaft as shown in FIG. 3. The output signal of the vehicle speed sensor 33 is applied to an adding coefficient signal SV setting section 34 and a multiplying coefficient setting section 36. The adding coefficient signal from the section 34 decreases as the vehicle speed increases (FIG. 5). Outputs of the torsion torque sensor 12 and the adding coefficient setting section 34 are added at an adding section 35 the output of which is applied to an assist signal is generated from the section 32. The assist signal IT generates from the section 32, when the torsion torque rises above a predetermined value and has a polarity dependent on the torsion torque direction of the steering shaft as shown in FIG. 4 (solid line). In accordance with the value of the adding coefficient signal SV, the assist signal It is shifted along the X-axis as shown by solid lines in FIG. 6.

Figure 6:
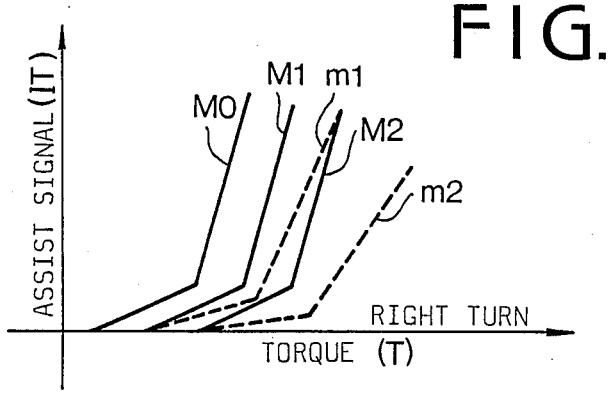
FIG. 6 is a graph showing the variation of the assist signal.
Figure 7:
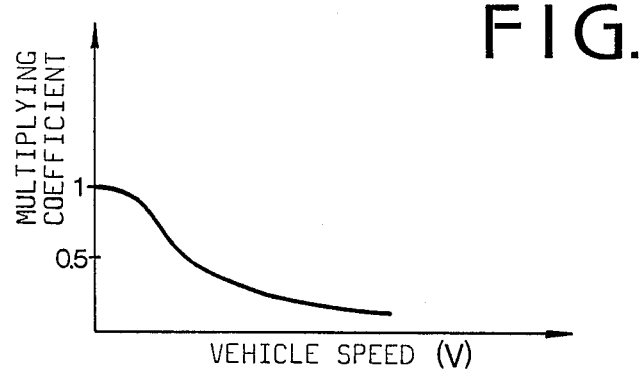
FIG. 7 is a graph of a multiplication coefficient.

FIG. 6 shows assist signals at a right turn. The value of assist signal decreases with an increase of the vehicle speed at the same torsion torque and increases with an increase of the torsion torque. On the other hand, the multiplying coefficient signal from the section 36 decreases with an increase of the vehicle speed (FIG. 7). The assist signal IT is multiplied by the multiplying coefficient at a multiplying section 37, so that the assist signal is corrected as shown by dotted line in FIG. 6.

Figure 9:
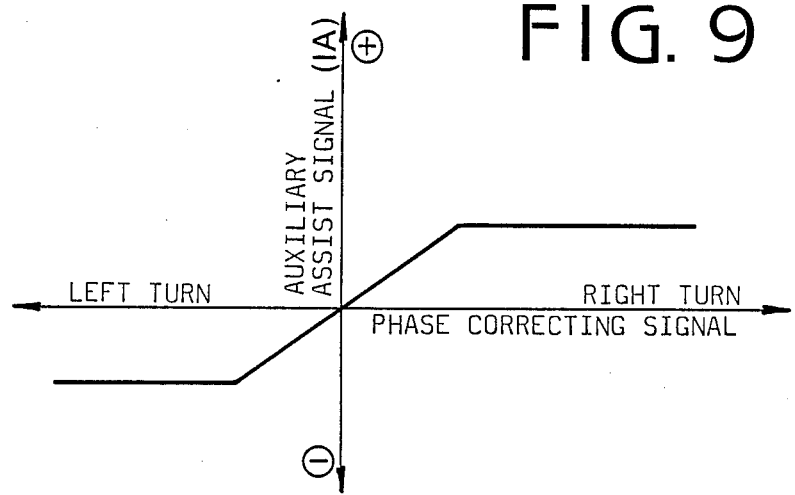
FIG. 9 is a graph showing an auxiliary assist signal.

The auxiliary assist command section 23 comprises a phase correcting section 51 applied with the output of torsion torque sensor 12 for producing an output which is proportional to the differentiation of the output of the sensor 12. Namely, the output of the section 51 represents the rate of the variation of the torsion torque. The output of the phase correcting section 51 is applied to an auxiliary assist signal generating section 52 to produce an auxiliary assist signal IA (FIG. 9). The output signal of the section 51 is also added to the output of the torsion torque sensor 12 and fed to the adding section 35, thereby correcting the phase of the assist signal to meet the operation of the motor 7. The section 51 includes a hysteresis providing section 51a, differentiator 51b, and gain providing section 51c.

Figure 8:
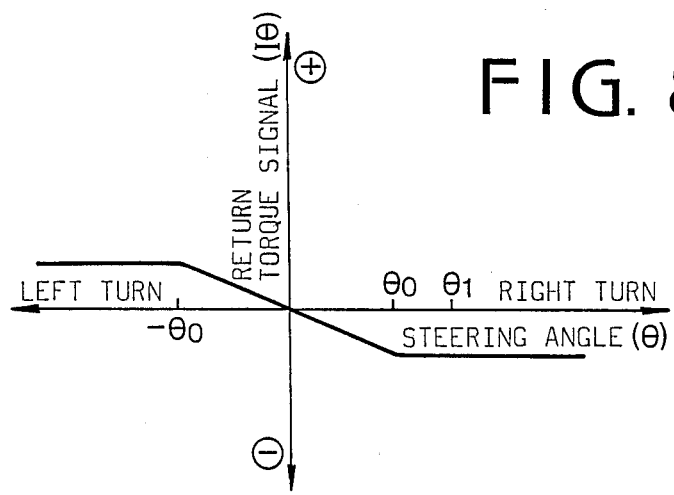
FIG. 8 is a graph of a characteristic of a return torque signal.

The return command section 24 includes the steering angle sensor 13, the output signal of which is applied to a return torque signal generating section 42. The section 42 generates a return torque signal $I\theta$ dependent on the steering angle (FIG. 8).

Figure 10:
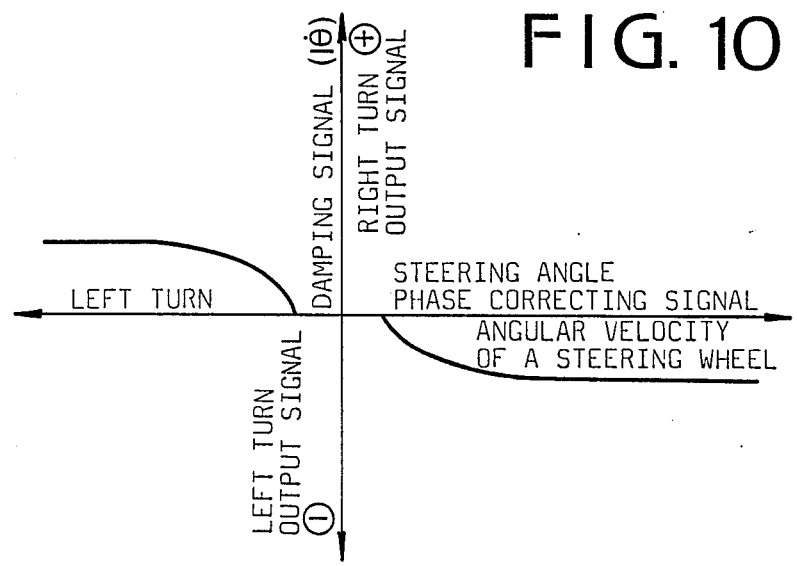
FIG. 10 is a graph showing a damping signal.

The damping command section 26 has a steering angle phase correcting section 61 applied with the signal from the steering angle sensor 13 for producing an output which is proportional to the differentiation of the output of the sensor 13, and a damping signal generating section 62 responsive to the output of the section 61 for producing a damping signal The section 61 has a hysteresis providing section 61a, differentiator 61b, and gain providing section 61c. As shown in FIG. 10, the damping signal generated when the steering angular velocity exceeds a predetermined small value, and increases with an increase of the steering angular velocity When the steering angular velocity exceeds a predetermined large value, the damping signal becomes constant. The polarity (direction) of the damping signal is the reverse of the polarity (direction) of the rotation of the steering wheel. The damping signal $I\theta$ is added to the return torque signal $I\theta$ from the section 42. The summation of both signals are fed to a vehicle speed gate 65 which opens to pass the summation when the vehicle speed exceeds a predetermined speed, for example 5 Km/h.

The assist signal IT, auxiliary assist signal IA, and the summation of the damping signal $I\theta$ and the return torque signal $I\theta$ are added and the summation is applied to a positive-negative deciding section 16 and an absolute value section 17 of the drive control section 25. The output of the positive-negative deciding section 16 is applied to the motor 7 through a motor driver 20. The output signal of the absolute value section 17 is applied to a duty ratio control section 18 which produces a pulse train. The pulse train is applied to the driver 20 so that the output torque of the motor 7 is controlled by the duty ratio of the pulse train. The output torque of the motor is fed back to the duty ratio control section 18 by an armature current detecting section 19.

When a torsion torque is generated by steering operation, an assist signal IT is generated from the assist command section 22. The polarity and absolute value of the assist signal is detected and the duty ratio is decided in accordance with the absolute value by the drive control section 25, so that the output torque of motor 7 is controlled to reduce the steering effort. As shown in FIG. 4 (solid line), since the assist signal increases with an increase of the torsion torque, the steering effort is properly reduced in accordance with the torsion torque.

As described above, the assist signal changes with the variation of the output of the vehicle speed sensor. 33. Referring to FIG. 6, reference Mo designates an assist signal at a vehicle speed of zero on the right turn of the steering wheel, and M1 and M2 are at higher speed which are moved in parallel along the X-axis. Assist signals M1 and M2 are further changed to signals m1 and m2 each having a small inclination by multiplying the signals by the multiplying coefficient from the section 36. Accordingly, the assist signal decreases with an increase of vehicle speed. Therefore, adequate steering effort is required to steer at higher vehicle speed, thereby preventing the occurrence of uneasiness in the drive.

On the other hand, return command section 24 produces a return torque signal $I\theta$ having a characteristic of FIG. 8. The return torque signal $I\theta$ increases with the increase of the steering angle $\theta$ until a predetermined angle $\pm\theta_o$ after which it has a constant value. For example, when the steering angle is held at an angle $\theta 1$ for a right turn, the motor 7 is controlled by the sum of a positive assist signal IT of section 23 and a negative return signal $I\theta$. The sum of both signals is shown by dotted line in FIG. 4. Accordingly, if the steering wheel is released, the torsion toque largely decreases, so that the summation of both signals has a negative value for the left turning. As a result, the motor 7 produces an output torque in the left turning direction so that friction in the steering system and inertial moment of the motor are reduced. Thus, the steering wheel can be easily returned to straight ahead with the aid of the caster effect. Since the return signal $I\theta$ decreases as the steering angle decreases, a high steering-wheel returnability is provided.

When the steering wheel is turned in a stationary state of a vehicle, the torsion torque increases rapidly because of large friction between the tires and the ground. The speed of the rapid increase of torque is detected by the phase correcting section 51 and the output thereof is added to the output of the sensor 12. Accordingly, an assist signal IT is immediately applied to drive control section 22 so as to operate the motor 7 without delay.

In response to the output of the phase correcting section 51, the auxiliary assist signal generating section 52 generates an auxiliary assist signal IA shown in FIG. 9. The auxiliary assist signal IA is also added to the assist signal IT. Accordingly, the output torque of the motor immediately assists the steering effort.

When the steering wheel is quickly turned a small angle during the driving of a vehicle, the rotational speed of the steering angle $\theta$ is detected by steering angle phase correcting section 61. The output of the section 61 is applied to damping signal generating section 62 which produces a damping signal $I\theta$ shown in FIG. 10. The damping signal $I\theta$ is added to the assist signal IT to reduce it. Accordingly, the output of the motor 7 is reduced, thereby increasing the steering effort. Thus, the occurrence of uneasiness during a quick steering operation can be prevented.

In the above-described steering system, there is provided hysteresis providing sections 51a, 61a for preventing the system from responding to small output signals of the sensors. The operation will be described hereinafter with reference to FIG. 11. At a step S1, it is determined whether the torsion torque Tn sensed by the sensor 12 is in a hysteresis providing range HR(FIG. 12). When the torque Tn is out of the range HR, the program proceeds to a step S2 where the difference between the present torque Tn and the last torque Tn-1 is produced as an output of the hysteresis providing section 51a. When the torque Tn is in the range HR, the program proceeds to a step S3. When the torque Tn is in a dead zone DZ (FIG. 12) at the step S3, no output is produced at a step S4. Thus, the system does not respond to a small output of the sensor 12, thereby preventing the consumption of electric power. If the torque Tn is higher than an upper limit value DZH of the dead zone, the program goes to a step S5 which calculates the difference of the upper limit value DZH from the present torque Tn as an output of the section 61a. Thus, a hysteresis characteristic is provided in the output. At a step S6, the present torque Tn is set as a new upper limit value DZHN for a subsequent program. At a step S7, the difference of the dead zone DZ from the present torque Tn is set as a new lower limit value DZLN for a subsequent program.

When the torque Tn is lower than a lower limit value DZL of the dead zone, the program goes to a step S8 which calculates the difference of the lower limit value DZL from the present torque Tn. At a step S9, the torque TN is set as a new lower limit value DZLN, and the summation of torque Tn and the dead zone DZ is set as a new upper limit value DZHN at a step S10.

Thus, the dead zone DZ moves within the hysteresis providing range HR. Accordingly, the control operation is effectively performed without increasing the dead zone.

The hysteresis providing section 61a also operates in the same manner as the section 51a.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In an electric power steering system having a motor operatively connected to a steering system for reducing steering effort, a torsion torque sensor provided for detecting torsion torque generating in the steering system in steering operation, assist means responsive to an output signal of the torsion torque sensor for producing an assist signal, driving means responsive to the assist signal for producing a signal for driving the motor to turn a steering wheel, a steering angle sensor provided for detecting steering angle of the steering wheel and for producing a steering angle signal, return means responsive to the steering angle signal for operating the motor to return the steering wheel, the improvement comprising:

the assist means including first hysteresis providing means having a first dead zone and for producing the assist signal when the output signal of the torsion torque sensor exceeds the first dead zone; and wherein said first hysteresis providing means has a hysteresis providing range and the first dead zone is moved within the hysteresis providing range when the output signal exceeds the first dead zone.

2. In an electric power steering system having a motor operatively connected to a steering system for reducing steering effort, a torsion torque sensor provided for detecting torsion torque generating in the steering system in steering operation, assist means responsive to an output signal of the torsion torque sensor for producing an assist signal, driving means responsive to the assist signal for producing a signal for driving the motor to turn a steering wheel, a steering angle sensor provided for detecting steering angle of the steering wheel and for producing a steering angle signal, return means responsive to the steering angle signal for operating the motor to return the steering wheel, the improvement comprising:

the assist means including first hysteresis providing means having a first dead zone and for producing the assist signal when the output signal of the torsion torque sensor exceeds the first dead zone; and damping signal generating means responsive to differentiation of the st steering angle signal for producing a damping signal, the damping signal generation means including second hysteresis providing means having a second dead zone and for producing the damping signal when the steering angle signal exceeds the second dead zone.

* * * * *